(No Model.) 2 Sheets—Sheet 1.
W. W. VARNEY.
AUTOMATIC VENTILATING VALVE.
No. 525,729. Patented Sept. 11, 1894.
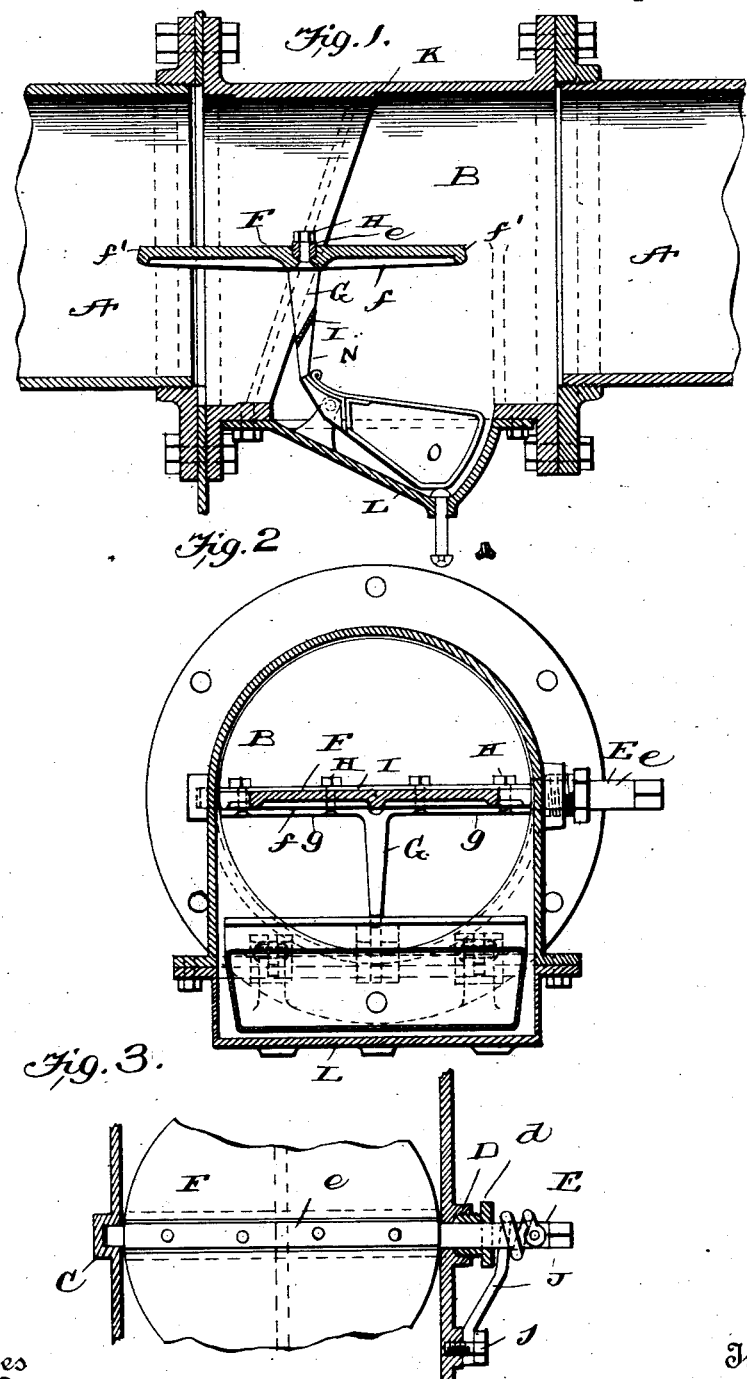

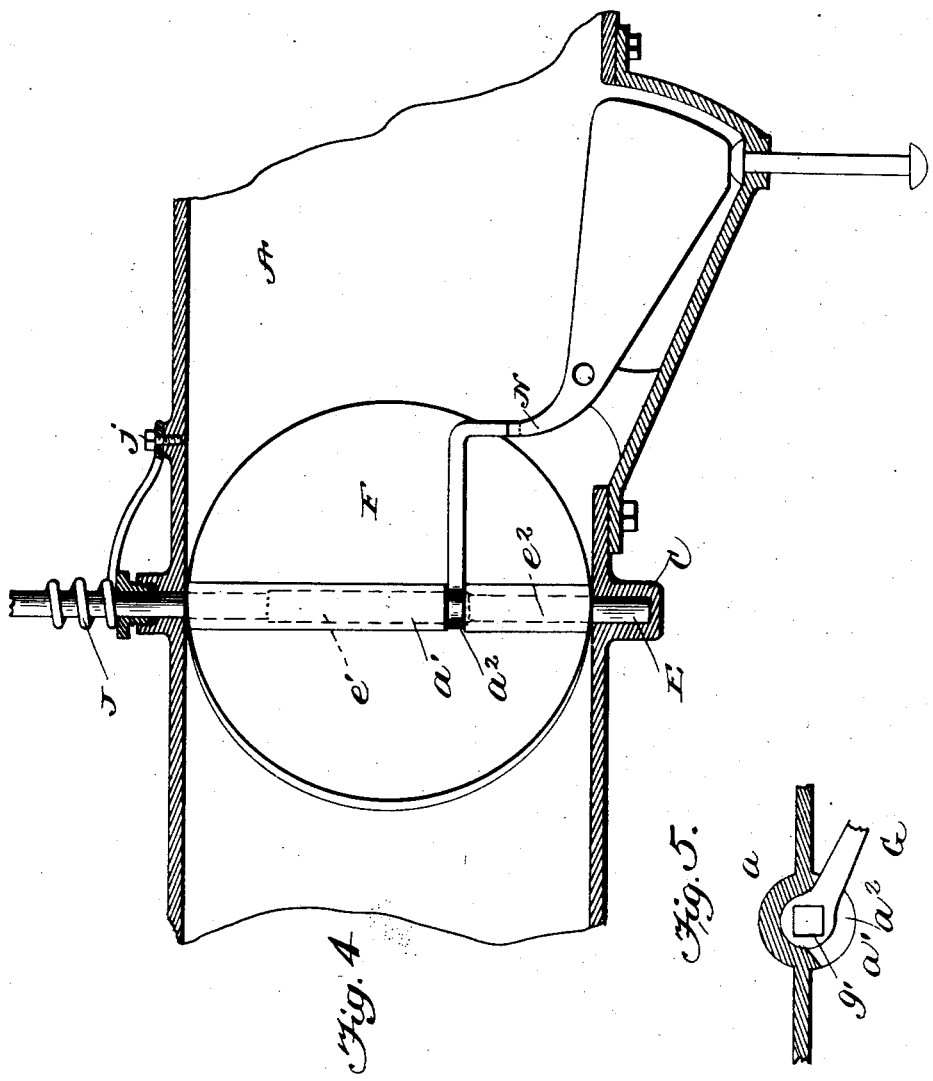

UNITED STATES PATENT OFFICE.

WILLIAM W. VARNEY, OF BALTIMORE, MARYLAND.

AUTOMATIC VENTILATING-VALVE.

SPECIFICATION forming part of Letters Patent No. 525,729, dated September 11, 1894.

Application filed January 22, 1892. Renewed March 26, 1894. Serial No. 505,197. (No model.)

*To all whom it may concern:*

Be it known that I, WILLIAM W. VARNEY, a citizen of the United States, residing at Baltimore and State of Maryland, have invented certain new and useful Improvements in Valves; and I do hereby declare the following to be a full, clear, and exact description of the invention, such as will enable others skilled in the art to which it appertains to make and use the same.

My invention relates to a new and improved automatic valve designed to be used in connection with a ventilating system for ships and other structures, and has for its object to produce a spring actuated valve that will normally remain open to permit the free passage of air but will be automatically closed either upon the entrance of water into the ventilating system or in the advent of an abnormal rise of temperature due to conflagration or other accidental cause, and to this end my invention consists in the novel construction, arrangement and combination of parts hereinafter fully described and afterward definitely pointed out in the claims, due reference being had to the accompanying drawings, forming a part of this specification, wherein—

Figure 1 is a vertical, longitudinal, central section of my improved device, the valve being shown open; Fig. 2, a section of Fig. 1; Fig. 3, a detail view showing the spring for actuating the valve; and Figs. 4 and 5, detail sectional views showing a modification.

Referring to the drawings, the letter A indicates a portion of one of the pipes or conduits of a ventilating system used on shipboard, and B a short section of pipe constituting the valve casing and adapted to be inserted between two sections of pipe forming the ventilating system. Said casing is provided upon one side with a step bearing C and upon its opposite side with an internally threaded boxing D through which passes a shaft E the end of which has its bearing in the step bearing C. Within the boxing D is arranged any suitable packing held in place by a packing nut *d*.

F indicates a butterfly valve which is centrally provided upon its under side with a rib or enlargement *f* extending from side to side of the valve and upon its opposite side is recessed, as shown in Fig. 1, for the reception of the reduced and flattened portion *e* of the shaft E.

G indicates an arm provided at its top with side extensions *g* which are adapted to lie against the under side of the valve and to which they are secured by means of bolts H which pass through the valve and the shaft, thus serving to rigidly secure to the shaft both the valve and the arm G. The arm G is formed in two parts united together by fusible solder, as at I, and for the sake of making a strong joint I prefer to make the adjoining edges of the two members of the arm as shown. Upon the outer end of the shaft E is arranged a coiled spring J, one end of which is secured, by a pin *j*, to the shaft, the other end of the spring being bolted to the casing B. This spring exerts its contractile force to close the valve. The casing B is provided with a slightly raised annular valve seat K and the peripheries of the upper and lower halves of the valve are oppositely inclined, as at *f'*, to insure the valve snugly seating itself when closed.

To the lower or under side of the casing B is bolted, or otherwise secured a pocket L, and, as shown, said pocket inclines or dips from one end toward the the other. Projecting inwardly from said pocket are bearings M within which is pivoted a curved arm N having secured thereto a float O. Through the bottom of the pocket L passes a push-pin P provided at each end with a head *p* to prevent its displacement. The bottom of the float O rests upon the upper end of said push-pin and does not come in contact with the pocket, whereby liability of the valve becoming stuck to the pocket through corrosion or other causes, is obviated, and the float free at all times to rise. By means of the push-pin the float may be raised by hand, for the purpose hereinafter described.

The operation of my improved valve is as follows: Normally it is desirable that the valve shall remain open for the unobstructed passage of the ventilating current of air through the pipes. To set the valve to its open position the shaft E carrying the valve is turned by means of a wrench, the end of said valve being squared for the purpose, until the valve lies in a horizontal position.

When the valve is in this position the lower end of the arm G engages the upper end of the float arm N, the adjoining ends of said arms being oppositely beveled as shown, and the valve thereby held in its open position. If, through accident, or otherwise, water should rise in the vessel and enter the ventilating pipes, it is necessary to close the valves to prevent the water from passing from one apartment to another. In this event my improved valve is automatically and immediately closed, the water entering the pocket and raising the float, which causes the float arm N to disengage the arm G, upon which the spring J exerts its force to close the valve in the direction of the arrows. If, on the other hand, the temperature within the ventilating pipes rises to an abnormal height from conflagration or other accidental causes, the fusible solder uniting the two parts of the arm G will melt, thus breaking the joint and allowing the spring to close the valve as before. If it is desired at any time to close the valve for other purposes than those mentioned, it is only necessary to push upon the push-pin P and thus raise the float, when the valve will immediately close as before described. It will be readily understood that in practice a number of such valves will be employed in order to protect the compartments of the vessel from injury by either fire or water.

In Figs. 4 and 5 I have shown a modification. As shown in said figures the valve F is mounted on a vertical axis. Said valve is cast with two central ribs $a$, $a'$, which are bored from end to end for the reception of the shaft, and one of said ribs, as $a$, is cut away, as at $a^2$, for the purpose hereinafter described. The shaft E passes through the bored portion of the valve and is provided with a squared portion $e'$ and above and below said square portion is round in cross section, as at $e^2$, $e^2$. G indicates an arm provided at one end with a square aperture $g'$ which is adapted to fit the squared portion $e$ of the shaft E and its other end engages the end of the float arm N in the manner heretofore described. The upper end of the shaft E is extended up through the deck or other suitable portion of the vessel where it will be in convenient reach without the necessity of entering the compartment containing the valve. When the valve is open the arm G will fit the squared portion of the shaft and its end engaging the end of the float valve N the valve will be held open against the action of the spring J. Upon the entrance of water in the casing or an abnormal temperature, the valve will be released and closed in the manner heretofore described. Should the float become inoperative or from any other cause it should be desirable to operate the valve by hand without being compelled to enter the compartment in which the valve is located, the valve can be operated by lifting the shaft E until the rounded portion $e^2$ of the shaft enters the apertured portion of the arm G, when the valve will immediately close under the action of the spring, the arm G remaining stationary.

Having described my invention, what I claim is—

1. The combination with a self-closing valve and its casing, of an arm carried by said valve, and an arm pivoted within the casing carrying at one end a float and at its other end engaging the arm carried by the valve and normally holding said valve open, the said float rising upon the entrance of water into the casing and disengaging said arms whereby the valve closes, substantially as described.

2. The combination with a self-closing valve and its casing, of an arm carried by said valve, an arm pivoted within the casing and carrying at one end a float and at its other end engaging the arm carried by the valve and normally holding said valve open, and a push-pin engaging said float, whereby the float may be raised by hand, substantially as described and for the purpose specified.

3. The combination with a self-closing valve and the casing provided at its bottom with a pocket, of an arm carried by said valve, and a pivoted arm carrying at one end a float resting in said pocket and at its other end engaging the arm carried by the valve and normally holding said valve open, substantially as described and for the purpose specified.

4. The combination with the valve and its casing, of a two-part arm carried by said valve and united by fusible solder, and an arm pivoted within the casing and carrying at one end a float and at its other end engaging the arm carried by the valve and normally holding said valve open, whereby the valve is released and automatically closes upon the entrance of water within the casing or upon an abnormal rise of temperature, substantially as shown and described.

5. The combination with a valve and its casing, of a spring engaging the shaft of the valve and operating to close the valve, an arm carried by the valve, and an arm pivoted within the casing and carrying at one end a float and at its other end engaging the arm carried by the valve and normally holding said valve open against the force of the spring, substantially as shown and described.

In testimony whereof I affix my signature in presence of two witnesses.

WILLIAM W. VARNEY.

Witnesses:
C. BERNARD WERLE,
ALEX. S. STEUART.